(Model.)

C., W. C., Jr., C. M. & F. TABER.
METHOD OF FORMING AND APPLYING ORNAMENTED PLASTIC MATERIAL TO PASSE PARTOUT MATS.

No. 248,527. Patented Oct. 18, 1881.

Witnesses:
J. A. Rutherford
A. H. Norris

Inventors
C. Taber, W. C. Taber, Jr.
C. M. Taber, & F. Taber,

By N. M. Mason
Attorney.

UNITED STATES PATENT OFFICE.

CHARLES TABER, WILLIAM C. TABER, JR., CHARLES M. TABER, AND FREDERIC TABER, OF NEW BEDFORD, MASSACHUSETTS.

METHOD OF FORMING AND APPLYING ORNAMENTED PLASTIC MATERIAL TO PASSE-PARTOUT MATS.

SPECIFICATION forming part of Letters Patent No. 248,527, dated October 18, 1881.

Application filed May 12, 1881. (Model.)

To all whom it may concern:

Be it known that we, CHARLES TABER, WILLIAM C. TABER, Jr., CHARLES M. TABER, and FREDERIC TABER, citizens of the United States, residing at New Bedford, in the county of Bristol and State of Massachusetts, have invented certain new and useful Improvements in Methods of Forming and Applying Ornamented Plastic Material to Passe-Partout Mats, of which the following is a specification.

This invention relates to an improvement in the method of ornamenting plastic material and applying the same around the opening in a passe-partout mat, which is composed of pasteboard or other similar material. Under the invention secured by Letters Patent No. 154,581, the entire face of the base or a portion thereof of a picture frame or mat has been covered with an ornamented molding of plastic or other similar material. Under our invention, however, the strips of the material, while in a plastic condition, are ornamented by means of suitable molds or dies, and while still in a plastic state the ornamented strip is applied and secured to the frame or mat. By applying the ornamented material in the form of a strip, and while in a plastic state, the edges of the strip can be made to exactly register with the edge of the frame, and the strip can be readily bent so as to conform to the various bends or angles.

Figure 1:
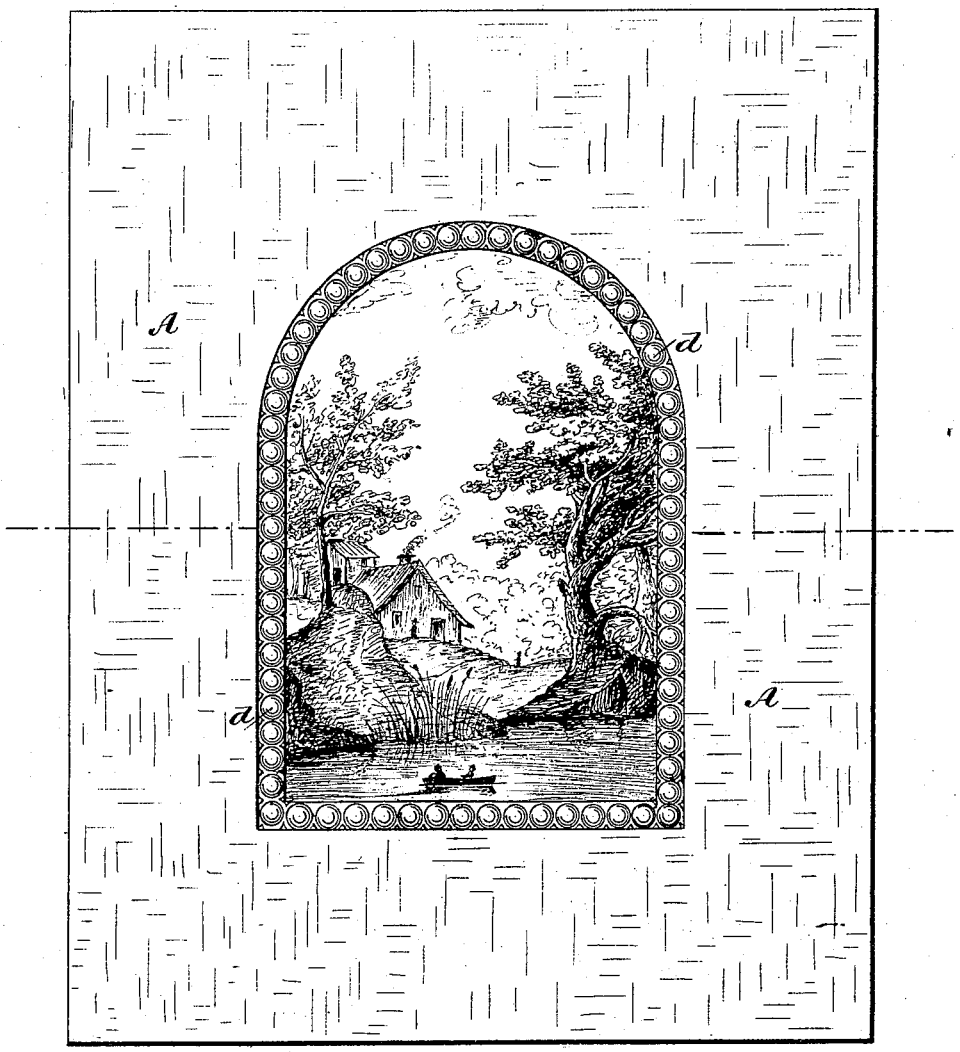
Figure 2:
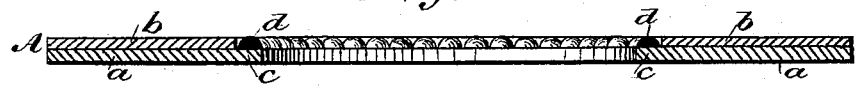

Figure 1 is a front view of a passe-partout mat embodying our invention, and Fig. 2 a transverse sectional view of the same.

The letter A indicates a passe-partout mat, consisting of two thicknesses, $a\ b$, of pasteboard or other stout paper, which are cemented or glued together, so as to create the usual central opening, through which the picture is exposed to view. The under thickness, $a$, of the mat is extended inwardly around the opening of the mat to form a projecting flange, $c$, which serves to receive and support the ornamental margin $d$ of the opening. This margin is composed of a strip of plastic material, which is provided on one side, while in a plastic condition, with ornamental figures, designs, or characters of any desired outline—in the present instance consisting of semi-globular projections. This strip is applied to the mat while still in a plastic state. The opposite side of the plastic strip, which is flat, is cemented, glued, or otherwise attached to the inward-projecting flange $c$, and it extends entirely around the opening in the mat.

The ornamental face of the plastic strip is gilded by any of the well-known methods—such, for instance, as laying on gold-leaf, enameling, or rubbing with gilding-powder, the whole imparting to the mat a very handsome, attractive, and distinguished appearance.

The ornamental figures, designs, or characters are impressed or otherwise formed in the strip, while it is in a plastic condition, by means of molds or dies, and then the strip is permitted to dry and solidify, when it becomes rigid and can be conveniently glued or cemented upon the flange of the mat.

An ornamental margin formed as explained possesses many advantages over the usual ornamental strips of paper usually pasted around the opening in a passe-partout mat, because it is not liable to tear, warp, or rumple up; and, further, having bas-relief or, if preferred, intaglio ornamental figures properly gilded, an æsthetic appearance is imparted to the mat, and it is rendered much more desirable as a parlor ornament in providing an embellished appearance to a portrait or other picture.

The plastic composition constituting the ornamental margin may be composed of any suitable material—such, for instance, as a compound of whiting, glue, and rubber.

What we claim is—

The herein-described mode of forming and applying ornamented plastic material to form a passe-partout mat, the same consisting in molding the ornaments in the material while in a plastic condition, and then applying a strip of such ornamented material to the board while still in a plastic state.

In testimony whereof we have hereunto set our hands in the presence of subscribing witnesses.

CHARLES TABER.
W. C. TABER, JR.
CHARLES M. TABER.
FREDERIC TABER.

Witnesses:
CHARLES R. PRICE,
H. W. MASON.